Patented Aug. 19, 1930

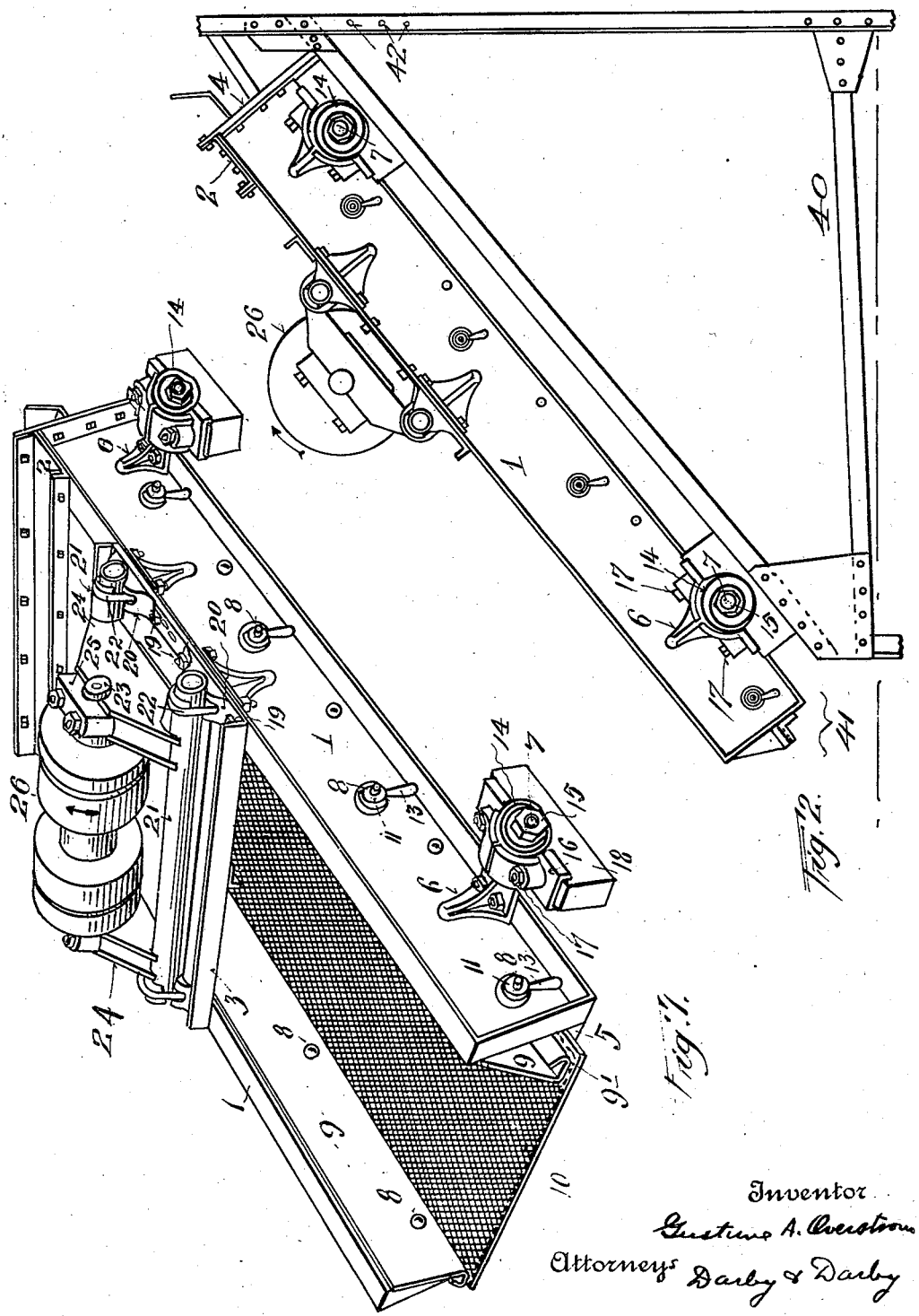

1,773,405

UNITED STATES PATENT OFFICE

GUSTAVE A. OVERSTROM, OF PASADENA, CALIFORNIA

VIBRATING SCREEN

Application filed March 30, 1925. Serial No. 19,200.

This application relates in general to the subject matter of my application Serial No. 413,376, filed September 28, 1930, for Vibrating screens now Patent No. 1,621,949, granted March 22, 1927, of the type normally vibrated at a high rate of speed. The particular feature of this application embraces rotating the vibrator element under such conditions and in such a direction as will cause some of the screened materials to travel up the incline of the screen, or, instead, be retarded in its downward progress, depending upon the incline of the screen and rate of vibration for the particular material undergoing separation.

My object is to provide a vibrating screen box, in which all of the screen is effective screening surface, thereby using up the minimum of screen cloth, and in which as many different sized products as may be desired can be separated.

Another object is to provide the most simple and efficient flexible supporting means to this screen box, so as to allow of it being vibrated without transmitting the vibrations to the structure on which the apparatus is supported.

A still further object is to provide a vibrating screening apparatus which is not sensitive to accidental overload, but which has a surplus of power available in case of need.

Other objects will appear in the specification and description of my invention.

In carrying out my invention I provide, generally stated, a vibrating screen box in which one or more screens are stretched tight. The box is supported on springs which are fastened to rigid supports. These springs allow of the frame being vibrated in a vertical plane. The vibrations are produced by the revolutions of a fast running unbalanced pulley, that revolves on a hollow shaft rigidly fastened to the screen box. The pulley has oil chambers at both ends.

The material is advanced from the head to the tail of the screen by gravity assisted by vibration, but the finer material is retarded in its downhill travel by the influence of the "uphill" direction of the pulley. This action causes a natural selection or stratification of the materials on the screen. The very fine particles will actually travel uphill, the fine material will stand still, the medium grade material will travel slowly downwards, and the coarse material will travel rapidly down the incline of the screen.

In the drawings accompanying this specification and forming a part thereof, Fig. 1 is a perspective view of one type of my vibrating screen, provided with an unbalanced unit capable of rotating in the direction indicated by the arrow and thereby causing the "uphill" tendency of the materials, as explained above.

Fig. 2 is a side elevation of my construction, showing the screen suspended at an angle suited for certain conditions. It is understood that the screen is positioned to meet the required needs.

Like numerals refer to similar parts throughout the views.

In the above mentioned application, I have shown and claimed a structure which embraces a general type of screen box, or equivalent, provided with an unbalanced unit. This unit is mounted to rotate at a high rate of speed in the direction so that the overbalancing element passes over its axis and towards the lower end of the screen box. That is to say, the rotation is left-handed or counter-clockwise.

In the present application I utilize the same instrumentalities, but I cause the rotation of the overbalancing unit to be in the reverse direction; that is, I cause it to rotate right-handed or in a direction so that the overbalancing element passes over the supporting axis in a direction towards the upper side of the inclined screen. This action produces a most surprising result in that, under proper conditions of speed of rotation and angle of inclination for the screen, a part of the materials to be screened will travel uphill; or, in case of proper incline and speed of vibration, said materials are more or less retarded in their descent, so that the finer materials are either retarded in their downward course or actually pass through the screen cloth at a higher lever than where fed on the screen. This mode of operation permits very close and accurate screening and at the same time increases the capacity of the screen due to the action on the materials and because the screen may be tilted at a greater angle so that the coarse materials are quickly separated from the finer materials.

Contrary to popular opinion, it is gravity and not the vibrations that accomplish the screening. The vibrations keep the oversize jumping out of the way and clear the meshes, allowing the undersize to drop through the meshes from the force of gravity.

I have observed that when a screen is overloaded, it may not actually screen through the meshes one-quarter as much material as when loaded slightly below capacity. The cause is simple; the overload gives a deep bed of material through which the vibrations are not able to drive the oversize, some of which may stay still, in the meshes, so that the undersize cannot drop through, hence the whole mass may slide down without being screened. Especially is this true when handling an overload of moist and sticky material.

From experience, I have found that it is necessary to provide a surplus of available power with corresponding resistance in a vibrating screen, so that if any sudden rush in the feed supply (due to a temporary choke or other accident) the power is strong enough to vibrate this overload.

By the use of more weight in the pulley and stiffer resistance springs than ordinarily are required to handle the usual load, the overload is taken care of without using up but little more power than if just the right weight in pulley with correspondingly weaker springs were used to barely handle the regular load.

It naturally takes power to keep the oversize in constant suspension, and on the move, hence the larger the tonnage handled, the more power is required. But the unbalanced weight tries to revolve around its center of gravity against what resistance it meets, hence if only small spring resistance were provided, the vibrations would be greater when underloaded or running idle, than when loaded to capacity or overloaded. Therefore, the vibrations must be of nearly same amplitude under all conditions of load. Otherwise, they would become destructive to the life of the apparatus when underloaded and impotent when overloaded.

The screen box is made up of the sides 1, to which are attached the head rail 2, the vibrator frame 3, the head end 4, the tail tie frame 5, the supporting brackets 6 for pipe 7, the tie bolts 8 for holding members 9 to tension the screen bottom 10 by means of nuts 11 having handles 13. Brackets 6 carry rigidly attached thereto the pipes 7, and on the ends of these pipes are pressed spiral springs 14, which are held in place by check nuts 15. The spiral springs 14 are clamped fast in the spring clamps 16, which are rigidly held by bolts 17 on to supporting supports 18. It is not material that the exact order of fastening, as here outlined, be employed, for, as stated in the above mentioned application, the arrangement of fastening may be such that the inside of the springs 14 vibrate with the screen box, as they do in the present instance, when the inner ends of the springs are attached to pipes 7, or the fastenings may permit the outside of the springs to vibrate and hold the inside stationary on the supports.

The screen cloth 10 is attached to the stretching members 9 along the side edges 9' so as to be drawn tight when the nuts 11 on bolts 8 are drawn up. The cloth is either fastened on to the member 9 or it is clamped thereby to the bottom frame, in the manner disclosed in the above mentioned application. These particular features are not claimed herein. It is important, however, that the screen cloth be stretched tight and that no projecting bolts or bolt heads obstruct the free passage of the material over and through the cloth.

The vibrator frame is rigidly bolted on to the upper part of the sides 1 by means of tie bolts 19 securing the frame 3 and the heaving blocks 20. Seated in blocks 20 are the vibrator frame carrying tubes 21, which are secured by U-bolts 22. The vibrator frame is placed a little nearer to the head of the screen box, so as to give the head end a greater effect than the tail end, and because the feed needs more violent shaking in the beginning than later on.

The vibrator journal 23 is rotatably held by the frame end members 24 and journal boxes 25 on the frame tubes 21; and these parts are all rigidly united so as to impart to the screen box the vibratory effect due to the rapid rotation of the unbalanced element 26, which is rotated in the direction of the arrow by any suitable means (not shown) at a speed of about 1500 to 2000 revolutions per minute. The material enters at the head end and with the screen box at the proper angle it will spread over the surface, and the coarser material will be stratified above the finer material. The finer material is arrested in its descent down the incline screen while the coarser material is retarded but little, due to the direction of rotation of the unbalanced element. As an illustration of a practical application of my invention, I will give the following specific example. If, for example, I want to produce an oversize and two or more finer grades of screened materials where the percentage of oversize is high, say about 75% of the feed, to convey this amount of oversize material on a screen, with but little incline, would be impractical, especially as it must be kept in constant suspension to allow the fine materials to drop through the screen bed. Under these circumstances, the screen is operated at a steep incline in order to let gravity carry off the oversize material rapidly. By the repeated uphill action of the pulley the fine material near the screen cloth is kept from running down at the same speed as the oversize and is repeatedly subjected to the uphill toss of the screen bed, to be thus graded and separated at small power cost.

Having now set forth the objects and nature of my invention, what I claim as new and useful, of my own invention, and desire to secure by Letters Patent, is:—

1. In a vibrating screen, supporting means, a screen box, spiral supporting springs interposed between said supporting means and said screen box to support the box at an angle, and means mounted on and near the head of said box to cause said box to vibrate with greater intensity in the upward direction to thereby cause materials to be screened to stratify and to cause the travel of a portion of said stratified material to travel uphill, said screen being at such an angle as to cause the material to move upwardly on the screen.

2. In a vibrating screen, a screen box, means to support said box, spiral springs between said supports and the screen box, adapted to carry said screen box at various angles of inclination, and rotating means mounted on the screen box near the higher end thereof, to vibrate the same, said rotating means revolving in a clockwise direction as viewed from the side of the screen box with the higher end thereof at the right, whereby the screen box is vibrated with greater intensity in the upward direction to cause the materials to be screened to stratify, and to exert a retarding effect upon the discharge of the body of stratified material from the lower end of the screen.

In testimony whereof I have hereunto set my hand on this fourth day of March, A. D. 1925.

GUSTAVE A. OVERSTROM.